(No Model.)

G. SEGER & B. BERNET.
Potato Digger.

No. 238,165. Patented Feb. 22, 1881.

Garret Seger & Bernhart Bernet

Witnesses:
T. H. Parsons
J. R. Drake

Inventors, by
J. R. Drake,
Atty.

N. PETERS, PHOTO-LITHOGRAPHER, WASHINGTON, D. C.

UNITED STATES PATENT OFFICE.

GARRET SEGER AND BERNHARD BERNET, OF BUFFALO, NEW YORK.

POTATO-DIGGER.

SPECIFICATION forming part of Letters Patent No. 238,165, dated February 22, 1881.

Application filed October 30, 1880. (No model.)

*To all whom it may concern:*

Be it known that we, GARRET SEGER, a citizen of Canada, now residing in Buffalo, county of Erie, and State of New York, and BERNHARD BERNET, a citizen of the United States, residing at Buffalo, in the county of Erie and State of New York, have invented new and useful Improvements in Potato-Diggers, of which the following is a specification.

The invention consists in its general construction, as hereinafter fully explained.

Figure 1:
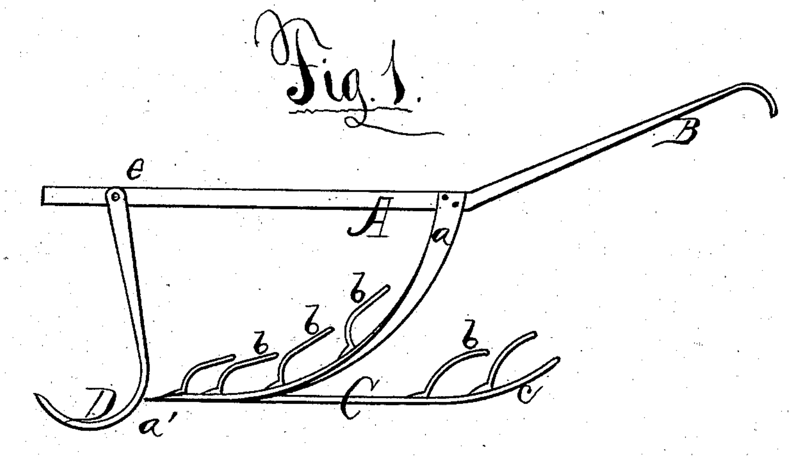
Figure 2:
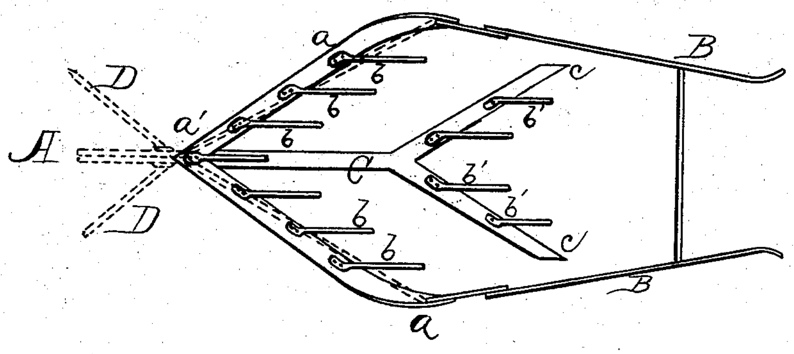

In the drawings, Figure 1 is a side elevation of the machine, and Fig. 2 a plan, the top frame in dotted lines.

A A represent the upper frame, and B B the usual handles joined to the frame A A. About at the junction of the handles B B with the frame A A is fastened a downwardly-projecting frame, *a a*, which first curves outward, and then the two sides *a a* join into a sharp point, *a'*, forming the digger, which projects forward. These pieces make a wide sweep from the point *a'* to their jointure with the frame A A, so as to be wide enough between the frames to entirely inclose the width of the potato-hills, the point *a'* going under the hills. Raised or curved fingers *b b b* are fastened to the side pieces, as shown, to sift the dirt through and throw the potatoes up.

From the point *a'* a piece forming a bottom frame, C, projects back behind the sides *a a*, and forks out into two additional frames, *c c*, which also curve up at their ends, (see Fig. 1,) and also have fingers *b' b' b'* fastened thereon, similar to fingers *b b* of side pieces, *a a*. This supplementary frame C *c c* completes the digging and clearing of the potatoes from the hills—that is, acts on those that the frame A A and fingers *b b* may not thoroughly disintegrate.

The great difficulty in digging potatoes is that the vines clog diggers or plows of any sort. To overcome this I have arranged two vine-catchers, being two outwardly-curved hooks, D D, pivoted at the top, at *e*, to the beam of the frame A, from which each hook hangs and curves out, as shown in dotted lines, Fig. 2. These, as the digger moves forward, catch the outlying or extending tops of the vines and carry them into and through the open digger-frame instead of allowing them to clog against the side frames, *a a*, and stop the working of the machine until removed. This is not a digging-shovel or plow, but a digging-frame, the fingers of which come just above the ground, and the frame in the ground inclosing the hills. The potatoes are thrown up and the dirt sifted through. This open frame is of great advantage, as it carries no dirt or vines with it, all go through, making it much easier to work and lighter to handle.

We claim—

In a potato-digger, the combination, with a suitable carrying-frame, of the frame *a a*, consisting of two outwardly and downwardly curved arms converging in a sharp point, *a'*, and armed with fingers *b*, arranged thereon, as shown, and the frame-arm C, extending rearward from point *a'*, and having upwardly and outwardly curved prongs *c c* and fingers *b'*, substantially as and for the purpose set forth.

In witness whereof we have hereunto signed our names in the presence of two subscribing witnesses.

GARRET SEGER.
BERNHARD BERNET.

Witnesses:
J. R. DRAKE,
H. A. BENTLIF.